United States Patent
Ruan et al.

(10) Patent No.: US 9,482,836 B2
(45) Date of Patent: Nov. 1, 2016

(54) COMPOSITE ELECTRO/OPTICAL MICROCABLE

(71) Applicant: EverPro Technologies Company Ltd., Wuhan, Hubei (CN)

(72) Inventors: Yunfang Ruan, Hubei (CN); Mingang Li, Hubei (CN); Xiaofan Su, Hubei (CN); Feng Chen, Hubei (CN); Zhuang Xiong, Hubei (CN)

(73) Assignee: EVERPRO TECHNOLOGIES COMPANY LTD., Wuhan, Hubei (CN)

( * ) Notice: Subject to any disclaimer, the term of this patent is extended or adjusted under 35 U.S.C. 154(b) by 0 days.

(21) Appl. No.: 14/689,880

(22) Filed: Apr. 17, 2015

(65) Prior Publication Data
US 2015/0219867 A1    Aug. 6, 2015

Related U.S. Application Data

(63) Continuation of application No. PCT/CN2013/085391, filed on Oct. 17, 2013.

(30) Foreign Application Priority Data

Oct. 22, 2012    (CN) .......................... 2012 2 0541032

(51) Int. Cl.
    *G02B 6/44*    (2006.01)
(52) U.S. Cl.
    CPC ........... *G02B 6/4416* (2013.01); *G02B 6/4436* (2013.01); *G02B 6/449* (2013.01); *G02B 6/4413* (2013.01)
(58) Field of Classification Search
    CPC ...... G02B 6/44; G02B 6/449; G02B 6/4463; G02B 6/4403; G02B 6/4413; G02B 6/4416

USPC .................... 385/100–120; 174/107, 105 SC
See application file for complete search history.

(56) References Cited

U.S. PATENT DOCUMENTS 4,547,626 A * 10/1985 Pedersen .............. G02B 6/4416
                                                    174/107
5,310,964 A *  5/1994 Roberts ................ G02B 6/4416
                                                    174/105 SC (Continued)

FOREIGN PATENT DOCUMENTS

CN    101714425 A       5/2010
CN    201600961    * 10/2010 ........... G02B 6/4463

(Continued)

OTHER PUBLICATIONS

International Search Report issued by State Intellectual Property Office of the P.R. China dated Jan. 23, b2014for Application No. PCT/CN2013/085391.

*Primary Examiner* — Akm Enayet Ullah
(74) *Attorney, Agent, or Firm* — Tim Tingkang Xia, Esq.; Locke Lord LLP

(57) ABSTRACT

In one aspect of the invention, the composite electro/optical microcable includes an outer sheath, and a composite electro/optical core covered by the outer sheath. The composite electro/optical core includes a strand of an insulated conductive wire set and an optical fiber unit, and a wrapping layer wrapping the strand of the insulated conductive wire set and the optical fiber unit. The insulated conductive wire set comprises one or more insulated conductive wires, each insulated conductive wire comprising one or more metal wires and an insulating layer covering the one or more metal wires. The optical fiber unit includes one or more optical fibers, one or more tight-buffered optical fiber cables, or one or more optical fiber ribbons.

15 Claims, 2 Drawing Sheets

(56) References Cited

U.S. PATENT DOCUMENTS

| | | | | |
|---|---|---|---|---|
| 5,444,809 A * | 8/1995 | Aoki | ................ | C09K 21/12 252/609 |
| 2010/0147549 A1* | 6/2010 | Shiina | ................ | H01B 7/295 174/113 C |
| 2010/0215328 A1* | 8/2010 | Tatat | ................ | G02B 6/4495 385/113 |
| 2010/0231228 A1* | 9/2010 | Koelblin | ................ | H01B 9/027 324/544 |
| 2011/0026889 A1* | 2/2011 | Risch | ................ | G02B 6/4402 385/102 |
| 2011/0174518 A1* | 7/2011 | Iwasaki | ................ | H01B 3/302 174/116 |
| 2011/0262085 A1* | 10/2011 | Takeda | ................ | C08L 23/06 385/100 |
| 2012/0063730 A1* | 3/2012 | Gagnon | ................ | G02B 6/4436 385/100 |
| 2014/0083736 A1* | 3/2014 | Gasser | ................ | B29C 47/56 174/102 R |
| 2014/0083739 A1* | 3/2014 | Jeker | ................ | H01B 1/24 174/120 SC |
| 2014/0234620 A1* | 8/2014 | Zhu | ................ | C08K 5/49 428/373 |
| 2014/0241677 A1* | 8/2014 | Sutehall | ................ | G02B 6/4433 385/104 |
| 2014/0348476 A1* | 11/2014 | Arao | ................ | G02B 6/4403 385/103 |

FOREIGN PATENT DOCUMENTS

| | | |
|---|---|---|
| CN | 102290140 A | 12/2011 |
| CN | 202487285 U | 10/2012 |
| CN | 202855432 U | 4/2013 |

* cited by examiner

COMPOSITE ELECTRO/OPTICAL MICROCABLE

CROSS-REFERENCE TO RELATED APPLICATIONS

This application is a continuation application of International Patent Application No. PCT/CN2013/085391, filed Oct. 17, 2013, which itself claims the priority to Chinese Patent Application No. 201220541032.9, filed Oct. 22, 2012 in the State Intellectual Property Office of P.R. China, which are hereby incorporated herein in their entireties by reference.

FIELD OF THE INVENTION

The present invention relates generally to a composite electro/optical microcable for connection and conduction among electronic components, which makes data signal transmission among the electronic components enter an optical communication phase.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

The connection and conduction among electronic components in most electronic devices are implemented using metal conductors (wires). The metal conductors undertake the tasks of both electric power transmission and data transmission among the electronic components. Due to limited amount and rate of the data transmission of the metal conductors, the data exchange rate among the electronic components is greatly limited. Compared with the data transmission of other media, fiber transmissions of data have an incomparable bandwidth advantage. It is a mainstream trend in the data transmission that the fiber transmissions of data replace all current data transmission modes, such as a USB and the Ethernet, which use copper cables as transmission media; wired transmissions of data in a local area network (LAN) are upgraded to have all-fiber architecture; and the fiber transmissions of data are extended from originally among offices to all consumer electronic products, which may make data transmissions among electronic components of electronic devices enter an optical communication era.

SUMMARY OF THE INVENTION

One of the objectives of this invention is to provide a composite electro/optical microcable for electric and data transmission among electronic components of a device.

In one aspect of the invention, the composite electro/optical microcable includes an outer sheath, and a composite electro/optical core covered by the outer sheath, where the composite electro/optical core comprises a strand of an insulated conductive wire set and an optical fiber unit, and a wrapping layer wrapping the strand of the insulated conductive wire set and the optical fiber unit.

In one embodiment, the outer sheath is a halogen-free flame-retardant sheath, and has an outer diameter being less than or equal to about 5 mm.

In one embodiment, the insulated conductive wire set comprises one or more insulated conductive wires, wherein each insulated conductive wire comprises one or more metal wires and an insulating layer covering the one or more metal wires.

In one embodiment, the insulated conductive wire set comprises about 2-10 insulated conductive wires, wherein the 2-10 insulated conductive wires are insulated from each other In one embodiment, the optical fiber unit comprises one or more optical fibers, one or more tight-buffered optical fiber cables, or one or more optical fiber ribbons.

In one embodiment, the optical fiber unit comprises about 1-12 optical fibers, or about 1-12 tight-buffered optical fiber cables.

In one embodiment, the optical fiber unit comprises one or more optical fibers wrapped in one or more loose tubes, where the one or more loose tubes are stranded with the insulated conductive wire set.

In one embodiment, the wrapping layer is a nonwoven wrapping layer, an aluminum foil wrapping layer, or a steel belt wrapping layer.

In one embodiment, the composite electro/optical microcable further comprises a braided layer formed between the composite electro/optical core and the outer sheath.

In one embodiment, the braided layer is an aramid yarn braided layer, or a metal-wire braided layer.

The present invention has, among other things, the following advantages. (1) Conductive metal wires, as elements for connection among electronic components in a transmission chain, are used for electric transmission among the electronic components, and an optical fiber is used for data transmission, which greatly improves a data exchange rate and amount among the electronic components, thereby meeting the requirement of transmitting high-definition video and audio signals at a data transmission rate exceeding 5 Gbps within about 200 meters. (2) The composite electro/optical microcable according to the present invention is simple in structure, small in size, light in weight, and superior in mechanical and bending properties. The composite electro/optical microcable is applicable to connection and conduction among the electronic components and products, and suitable for being used in narrow spaces in computer hardware and components, and convenient to use, which makes the electro/optical communications and the consumer electronic products in future operate more rapidly in an electro/optical interface. (3) By utilizing a wrapping layer and a braided layer, mutual interference between electric signals is effectively avoided, thereby greatly improving stability and reliability of the signal transmission. (4) not only has the optical communication unit a desirable branch connection property, but other communication units have a desirable soldering property, thereby greatly facilitating fabrication of joints and connectors for the composite electro/optical cable.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
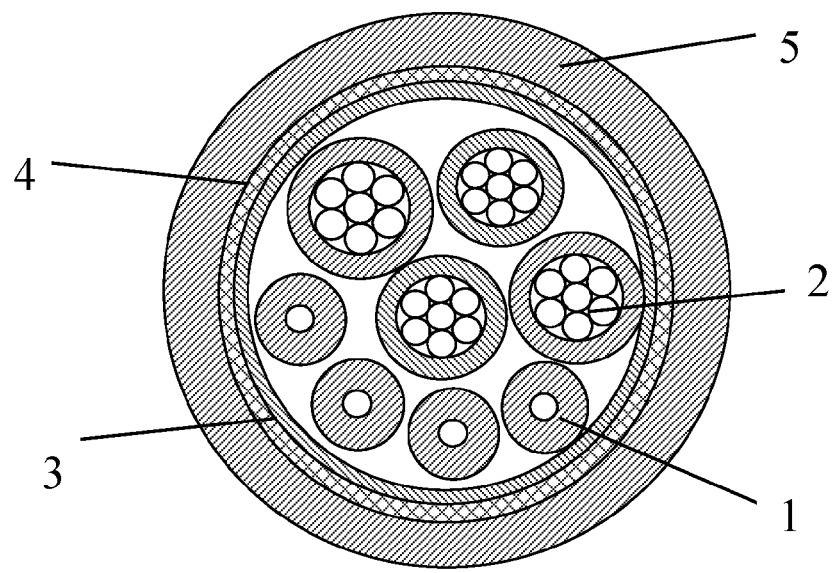
FIG. 1 is a cross-sectional view of a composite electro/optical microcable according to a first embodiment of the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in one aspect, relates to a composite electro/optical microcable.

Referring to FIG. 1, a composite electro/optical microcable is shown according to a first embodiment of the invention. The composite electro/optical microcable includes a halogen-free flame-retardant sheath (cover layer) 5, and a composite electro/optical core covered by the sheath 5. The composite electro/optical core comprises a strand of an insulated conductive wire set 2 and an optical fiber unit 1, and a wrapping layer 3 wrapping the strand of the insulated conductive wire set 2 and the optical fiber unit 1. In certain embodiments, the insulated conductive wire set 2 comprises one or more insulated conductive wires, where each insulated conductive wire comprises one or more metal wires and an insulating layer covering the one or more metal wires. In certain embodiments, the optical fiber unit comprises one or more optical fibers, one or more tight-buffered optical fiber cables, or one or more optical fiber ribbons. In one embodiment, the one or more optical fibers are wrapped in one or more loose tubes. In this exemplary embodiment shown in FIG. 1, in the composite electro/optical core, the optical fiber unit 1 comprises four tight-buffered optical fiber cables and four insulated conductive wires 2. In certain embodiment, the insulated conductive wire 2 is formed of multiple copper wires and an insulating layer covering the multiple copper wires. In one embodiment, the wrapping layer 3 is a nonwoven wrapping layer, which is covered with a braided layer 4. In one embodiment, the braided layer 4 is a metal-wire braided layer. In one embodiment, the halogen-free flame-retardant sheath 5 has an outer diameter being less than or equal to about 5 mm.

Figure 2:
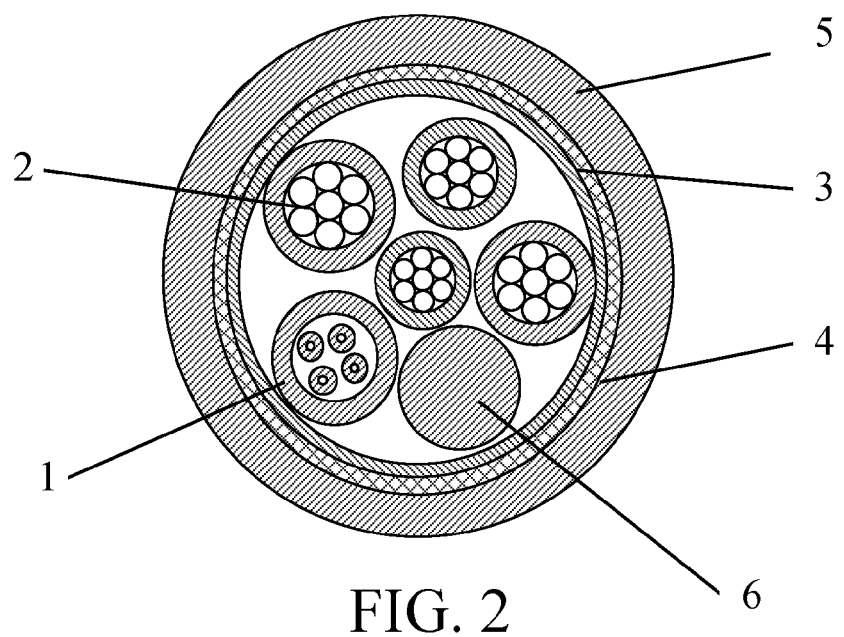
FIG. 2 is a cross-sectional view of a composite electro/optical microcable according to a second embodiment of the present invention.

Referring to FIG. 2, a composite electro/optical microcable is shown according to a second embodiment of the invention. The second embodiment of the composite electro/optical microcable is structurally similar to that of the first embodiment shown in FIG. 1, except that the optical fiber unit 1 comprises four optical fibers encased in a loose tube. In addition, the composite electro/optical core also has a filler rope 6 in the second embodiment. The loose tube encasing the four optical fibers, four insulated conductive wires 2 and the filler rope 6 are stranded and wrapped with the wrapping layer 3 to form an integrally composite electro/optical cable core. In this example, the wrapping layer 3 is an aluminum foil wrapping layer.

Figure 3:
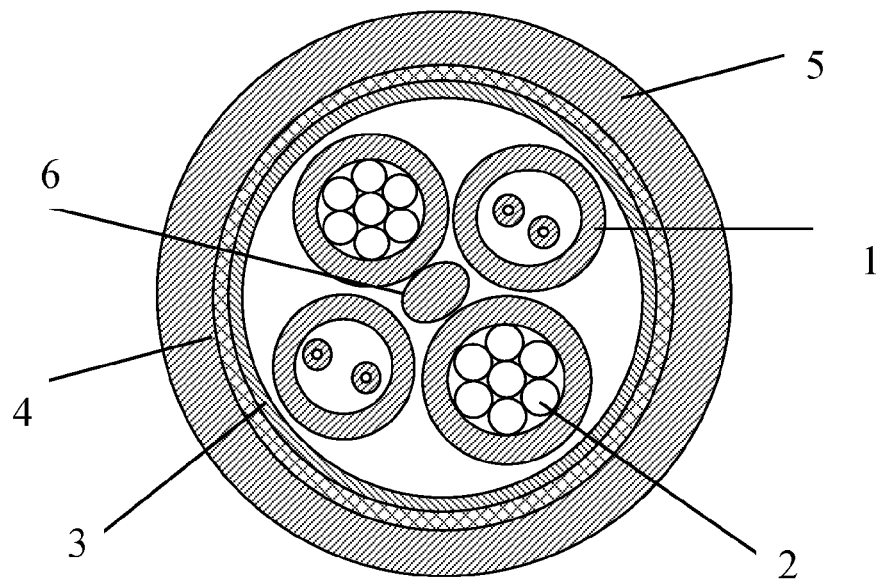
FIG. 3 is a cross-sectional view of a composite electro/optical microcable according to a third embodiment of the present invention.

Referring to FIG. 3, a composite electro/optical microcable is shown according to a third embodiment of the invention. Different from the second embodiment shown in FIG. 2, the composite electro/optical core in the third embodiment includes two loose tubes 1 and two insulated conductive wires 2. Each loose tube 1 encases two optical fibers. The two loose tubes 1 and the two insulated conductive wires 2 are alternately arranged in a circumferential direction, and a filler rope 6 is disposed in a center of a gap among the two loose tubes 1 and the two insulated conductive wires 2.

Figure 4:
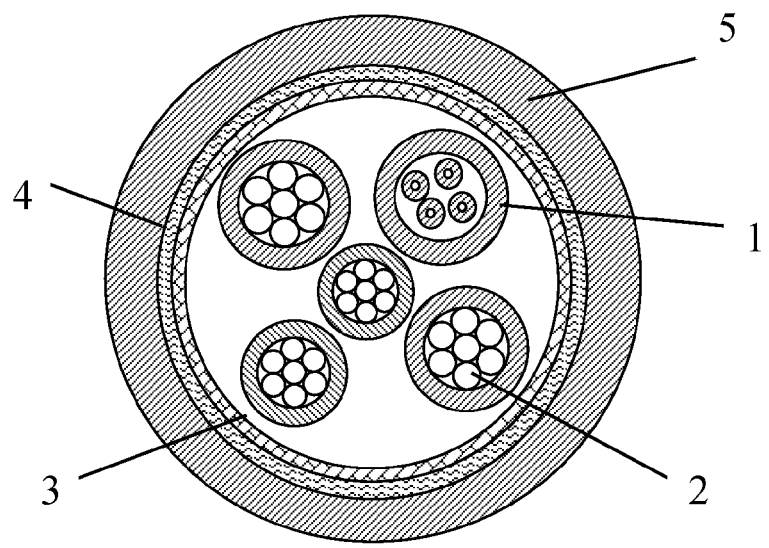
FIG. 4 is a cross-sectional view of a composite electro/optical microcable according to a fourth embodiment of the present invention.

Referring to FIG. 4, a composite electro/optical microcable is shown according to a fourth embodiment of the invention. Different from the second embodiment shown in FIG. 2, the composite electro/optical core in the fourth embodiment is formed by integrally stranding one loose tube and four insulated conductive wires 2 and coating the same with a wrapping layer 3. In one embodiment, the wrapping layer is a steel belt wrapping layer. In one embodiment, the wrapping layer is coated with an aramid yarn braided layer.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A composite electro/optical microcable, comprising:
  an outer sheath; and
  a composite electro/optical core covered by the outer sheath, wherein the composite electro/optical core comprises a strand of an insulated conductive wire set and an optical fiber unit, and a wrapping layer wrapping the strand of the insulated conductive wire set and the optical fiber unit,
  wherein the outer sheath is a halogen-free flame-retardant sheath; and
  wherein the wrapping layer is an aluminum foil wrapping layer, or a steel belt wrapping layer.

2. The composite electro/optical microcable according to claim 1, wherein the outer sheath has an outer diameter being less than or equal to about 5 mm.

3. The composite electro/optical microcable according to claim 1, wherein the insulated conductive wire set comprises one or more insulated conductive wires, wherein each insulated conductive wire comprises one or more metal wires and an insulating layer covering the one or more metal wires.

4. The composite electro/optical microcable according to claim 3, wherein the insulated conductive wire set comprises about 2-10 insulated conductive wires, wherein the 2-10 insulated conductive wires are insulated from each other.

5. The composite electro/optical microcable according to claim 1, wherein the optical fiber unit comprises one or more optical fibers, one or more tight-buffered optical fibers, or one or more optical fiber ribbons.

6. The composite electro/optical microcable according to claim 5, wherein the optical fiber unit comprises about 1-12 optical fibers, or about 1-12 tight-buffered optical fibers.

7. The composite electro/optical microcable according to claim 1, wherein the optical fiber unit comprises one or more optical fibers wrapped in one or more loose tubes, wherein the one or more loose tubes are stranded with the insulated conductive wire set.

8. The composite electro/optical microcable according to claim 1, further comprising a braided layer formed between the composite electro/optical core and the outer sheath.

9. The composite electro/optical microcable according to claim 8, wherein the outer sheath has an outer diameter being less than or equal to about 5 mm.

10. The composite electro/optical microcable according to claim 8, wherein the insulated conductive wire set comprises one or more insulated conductive wires, wherein each insulated conductive wire comprises one or more metal wires and an insulating layer covering the one or more metal wires.

11. The composite electro/optical microcable according to claim 10, wherein the insulated conductive wire set comprises about 2-10 insulated conductive wires, wherein the 2-10 insulated conductive wires are insulated from each other.

12. The composite electro/optical microcable according to claim 8, wherein the optical fiber unit comprises one or more optical fibers, one or more tight-buffered optical fibers, or one or more optical fiber ribbons.

13. The composite electro/optical microcable according to claim 12, wherein the optical fiber unit comprises about 1-12 optical fibers, or about 1-12 tight-buffered optical fibers.

14. The composite electro/optical microcable according to claim 8, wherein the optical fiber unit comprises one or more optical fibers wrapped in one or more loose tubes, wherein the one or more loose tubes are stranded with the insulated conductive wire set.

15. The composite electro/optical microcable according to claim 8, wherein the braided layer is an aramid yarn braided layer, or a metal-wire braided layer.

* * * * *